United States Patent
Xue

(10) Patent No.: US 11,238,124 B2
(45) Date of Patent: Feb. 1, 2022

(54) SEARCH OPTIMIZATION BASED ON RELEVANT-PARAMETER SELECTION

(71) Applicant: Microsoft Technology Licensing, LLC, Redmond, WA (US)

(72) Inventor: Huichao Xue, Santa Clara, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 95 days.

(21) Appl. No.: 16/553,375

(22) Filed: Aug. 28, 2019

(65) Prior Publication Data

US 2021/0064684 A1    Mar. 4, 2021

(51) Int. Cl.
| | | |
|---|---|---|
| G06F 7/02 | (2006.01) | |
| G06F 16/00 | (2019.01) | |
| G06F 16/9538 | (2019.01) | |
| G06N 20/20 | (2019.01) | |
| G06F 16/9035 | (2019.01) | |
| G06F 16/9535 | (2019.01) | |

(52) U.S. Cl.
CPC ...... *G06F 16/9538* (2019.01); *G06F 16/9035* (2019.01); *G06F 16/9535* (2019.01); *G06N 20/20* (2019.01)

(58) Field of Classification Search
CPC .. G06F 16/9538; G06F 16/335; G06F 16/337; G06F 16/9035; G06F 16/9535; G06F 16/24578; G06Q 10/1053; G06Q 10/063112; G06N 20/20
See application file for complete search history.

(56) References Cited

U.S. PATENT DOCUMENTS

| | | | |
|---|---|---|---|
| 2014/0122355 A1* | 5/2014 | Hardtke | G06Q 10/105 705/321 |
| 2015/0248647 A1* | 9/2015 | Goel | G06Q 10/1053 705/321 |
| 2016/0260064 A1* | 9/2016 | Ahmed | H04L 67/306 |
| 2018/0121879 A1* | 5/2018 | Zhang | G06Q 10/063112 |
| 2018/0336241 A1* | 11/2018 | Noh | G06F 16/958 |
| 2019/0042646 A1* | 2/2019 | Hoang | G06F 16/635 |
| 2020/0364282 A1* | 11/2020 | Kent | G06N 20/00 |

* cited by examiner

*Primary Examiner* — Bruce M Moser
(74) *Attorney, Agent, or Firm* — Schwegman Lundberg & Woessner, P.A.

(57) ABSTRACT

Methods, systems, and computer programs are presented for search optimization based on relevant-parameter selection. One method includes an operation for training a machine-learning program with information about users of an online service to generate a machine-learning model that calculates parameter preference scores for a plurality of parameters. Further, the method includes operations for detecting a job search for a user, identifying user parameters associated with the user, and calculating, by the machine-learning model, the parameter preference scores for the user parameters. Further, search parameters are determined by selecting a predetermined number of user parameters base on the parameter preference scores. A search of a job-postings database is performed with the search parameters, and the results are presented on a display.

17 Claims, 13 Drawing Sheets

US 11,238,124 B2

SEARCH OPTIMIZATION BASED ON RELEVANT-PARAMETER SELECTION

TECHNICAL FIELD

The subject matter disclosed herein generally relates to methods, systems, and machine-readable storage media for searching information based on user's information.

BACKGROUND

Performing quick searches on a large amount of data often requires taking multiple steps of narrowing possible results using different search parameters. If the search takes too long, the user may quit searching, and if the search is performed with few parameters or using rough approximations, the results may not be accurate.

As the number of items grows in a database, such as in a job catalogue for members of an online service, search algorithms encounter growth bottlenecks as search algorithm complexity grows together with the number of items.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
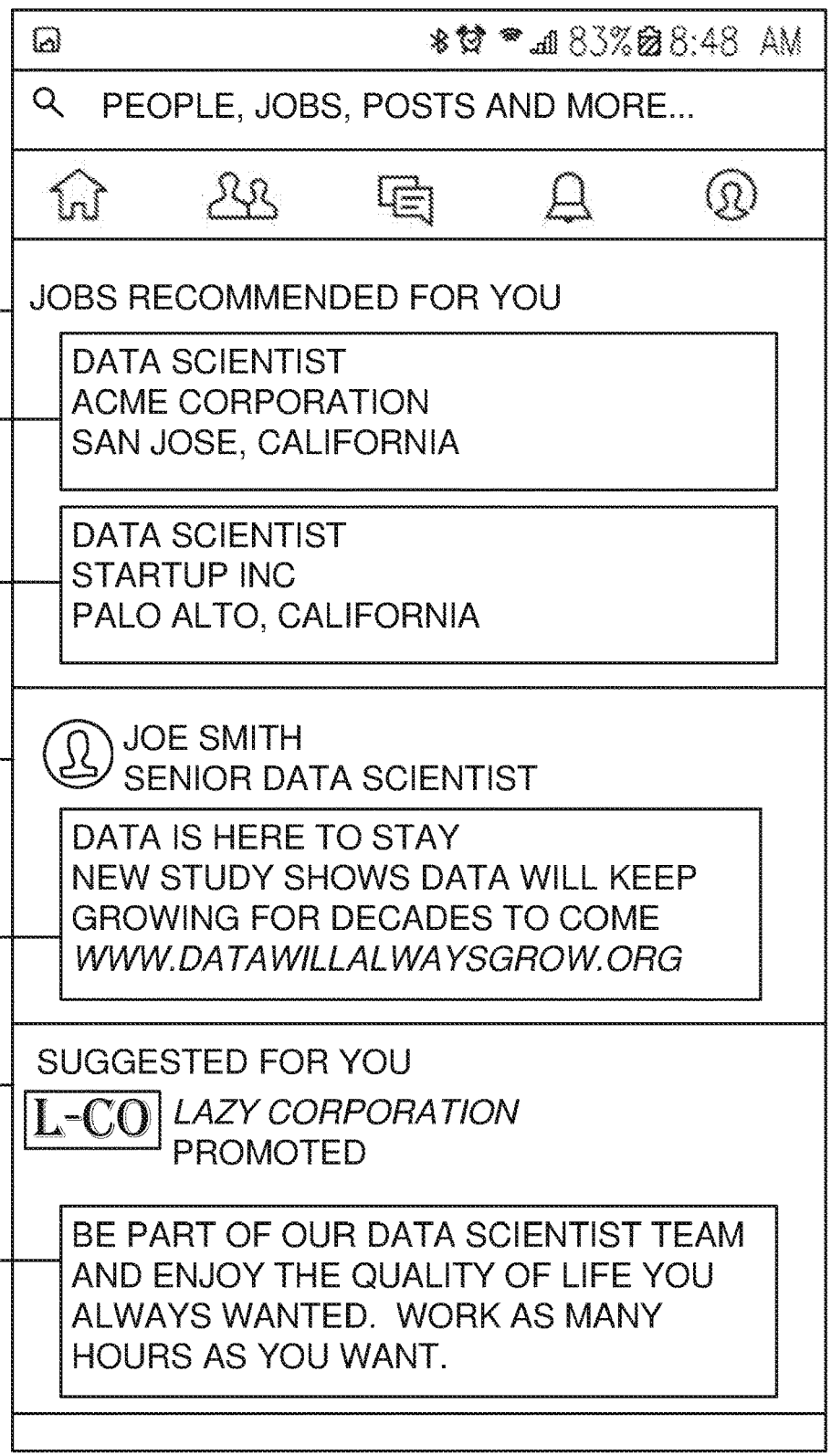
FIG. 1 is a screenshot of a user feed that includes items in different categories, according to some example embodiments.

Example methods, systems, and computer programs are directed to search optimization based on relevant-parameter selection. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Overview

Scalability is a challenge when building a job recommendation system. For example, a job postings database may include 10 million job postings. Finding jobs for a particular user requires the ability to perform job searches quickly, especially for services with millions of users. Being able to quickly locate the right subset of jobs to recommend is an important task for the success of the service to guarantee customer satisfaction.

Traditional candidate selection algorithms rely on applying different types of filters at different steps. For example, a job search for a user may do an initial quick filtering of jobs based on the skills, title, and function of the user by filtering out job postings with low scores.

To improve search quality, search algorithms become more complex, which results in higher serving costs (e.g., resources required for the search and amount of time used by the search). In one implementation, a rough initial search is performed to reduce the number of candidate results (e.g., from 10 million to 50,000) followed by a better search on the candidate results to reduce them to a smaller number (e.g., 6,000 candidate results). However, as the job catalogue expands, this approach faces challenges of being quick and being accurate to produce the best possible results.

In some implementations, an enhanced search filtering algorithm is proposed that uses machine learning to select the best clauses (e.g., parameters) for searching. The best clauses are those classes that are most helpful for finding the best results. For example, clauses that apply to too many candidate results (low filtering criteria) or clauses that are irrelevant (e.g., user skills that are irrelevant to searching the best job postings) are eliminated. This way, the access to the database is faster because fewer search parameters are utilized. Since accuracy is also improved with the best clauses, the enhanced search filtering algorithm fetches a smaller number of result candidates and may be used to replace two filtering steps, thereby reducing serving costs. One general aspect includes a machine-learning model that learns from users' previous job applications to select the best job-search parameters. The model provides a score for each of the possible search criteria (e.g., user skills) and selects a reduced number of search criteria to perform a database search.

For example, within job searches, only a few of the skills, titles, and functions of the user actually contribute significantly to finding the best job postings. For example, a user may have 100 skills but some of those skills may be too broad (e.g., computer science) or irrelevant for job applications (e.g., knowledge of LaTeX).

One general aspect includes a method that includes an operation for training a machine-learning program with information about users of an online service to generate a machine-learning model that calculates parameter preference scores for a plurality of parameters. Further, the method includes operations for detecting a job search for a user, identifying user parameters associated with the user, and calculating, by the machine-learning model, the parameter preference scores for the user parameters. Further, search parameters are determined by selecting a predetermined number of user parameters base on the parameter preference scores. A search of a job-postings database is performed with the search parameters, and the results are presented on a display.

Although some of the embodiments are presented with reference to job searches, the same principles may be applied to searches for other types of items.

FIG. 1 is a screenshot of a user feed that includes items in different categories, according to some example embodiments. In the example embodiment of FIG. 1, the user feed 100 includes different categories, such as job recommendations 102, user posts 106, and sponsored items 108; other embodiments may include additional categories.

In one example embodiment, a social network user interface provides the job recommendations 102 (e.g., job posts 103 and 104) that match the job interests of the user and that are presented without a specific job search request from the user, referred to herein as "jobs you may be interested in" (JYMBII).

The user posts 106 include items 107 posted by users of the social network (e.g., items posted by connections of the user), and may be comments made on the social network, pointers to interesting articles or webpages, etc.

The sponsored items 108 are items 109 placed by sponsors of the social network, which pay a fee for posting those items on user feeds, and may include advertisements or links to webpages that the sponsors want to promote.

Although the categories are shown as separated within the user feed 100, the items from the different categories may be intermixed, and not just be presented as a block. Thus, the user feed 100 may include a large number of items from each of the categories, and the social network decides the order in which these items are presented to the user based on the desired utilities. Additionally, the user may receive in-network communications from other users. The communications may originate by other users who are socially connected with the user or by unconnected users.

Figure 2:
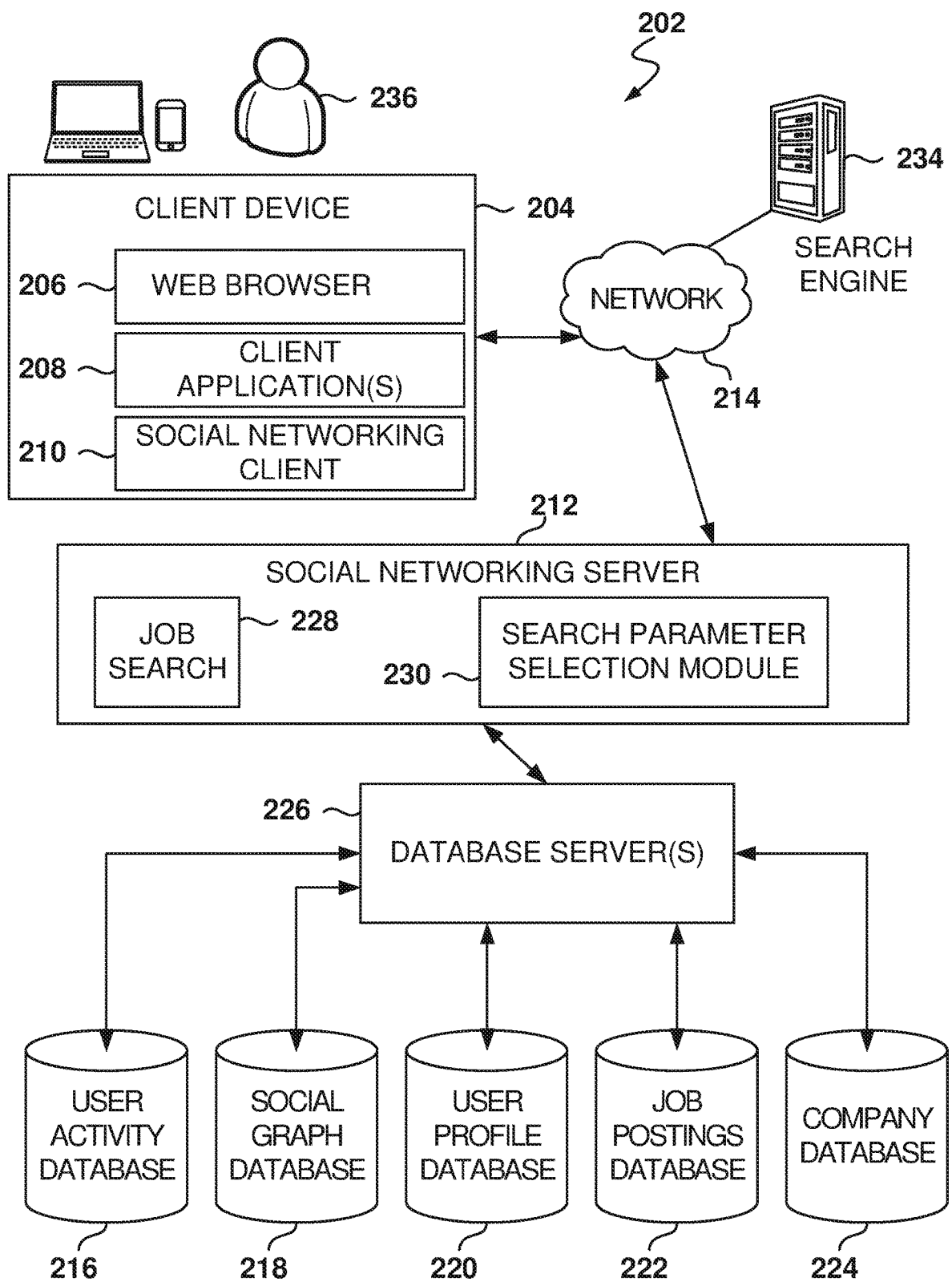
FIG. 2 is a block diagram illustrating a networked system, according to some example embodiments.

FIG. 2 is a block diagram illustrating a networked system, according to some example embodiments, including a social networking server 212, illustrating an example embodiment of a high-level client-server-based network architecture 202. Embodiments are presented with reference to an online service and, in some example embodiments, the online service is a social networking service.

The social networking server 212 provides server-side functionality via a network 214 (e.g., the Internet or a wide area network (WAN)) to one or more client devices 204. FIG. 2 illustrates, for example, a web browser 206, client application(s) 208, and a social networking client 210 executing on a client device 204. The social networking server 212 is further communicatively coupled with one or more database servers 226 that provide access to one or more databases 216-224.

The client device 204 may comprise, but is not limited to, a mobile phone, a desktop computer, a laptop, a portable digital assistant (PDA), a smart phone, a tablet, a netbook, a multi-processor system, a microprocessor-based or programmable consumer electronic system, or any other communication device that a user 236 may utilize to access the social networking server 212. In some embodiments, the client device 204 may comprise a display module (not shown) to display information (e.g., in the form of user interfaces).

In one embodiment, the social networking server 212 is a network-based appliance that responds to initialization requests or search queries from the client device 204. One or more users 236 may be a person, a machine, or other means of interacting with the client device 204. In various embodiments, the user 236 interacts with the network architecture 202 via the client device 204 or another means.

The client device 204 may include one or more applications (also referred to as "apps") such as, but not limited to, the web browser 206, the social networking client 210, and other client applications 208, such as a messaging application, an electronic mail (email) application, a news application, and the like. In some embodiments, if the social networking client 210 is present in the client device 204, then the social networking client 210 is configured to locally provide the user interface for the application and to communicate with the social networking server 212, on an as-needed basis, for data and/or processing capabilities not locally available (e.g., to access a user profile, to authenticate a user 236, to identify or locate other connected users 236, etc.). Conversely, if the social networking client 210 is not included in the client device 204, the client device 204 may use the web browser 206 to access the social networking server 212.

In addition to the client device 204, the social networking server 212 communicates with the one or more database servers 226 and databases 216-224. In one example embodiment, the social networking server 212 is communicatively coupled to a user activity database 216, a social graph database 218, a user profile database 220, a job postings database 222, and a company database 224. The databases 216-224 may be implemented as one or more types of databases including, but not limited to, a hierarchical database, a relational database, an object-oriented database, one or more flat files, or combinations thereof.

The user profile database 220 stores user profile information about users 236 who have registered with the social networking server 212. With regard to the user profile database 220, the user 236 may be an individual person or an organization, such as a company, a corporation, a non-profit organization, an educational institution, or other such organizations.

In some example embodiments, when a user 236 initially registers to become a user 236 of the social networking service provided by the social networking server 212, the user 236 is prompted to provide some personal information, such as name, age (e.g., birth date), gender, interests, contact information, home town, address, spouse's and/or family users' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the user profile database 220. Similarly, when a representative of an organization initially registers the organization with the social networking service provided by the social networking server 212, the representative may be prompted to provide certain information about the organization, such as a company industry. This information may be stored, for example, in the company database 224.

As users 236 interact with the social networking service provided by the social networking server 212, the social networking server 212 is configured to monitor these interactions. Examples of interactions include, but are not limited to, commenting on posts entered by other users 236, viewing user profiles, editing or viewing a user 236's own profile, sharing content outside of the social networking service (e.g., an article provided by an entity other than the social networking server 212), updating a current status, posting content for other users 236 to view and comment on, posting job suggestions for the users 236, searching job postings, and other such interactions. In one embodiment, records of these interactions are stored in the user activity database 216, which associates interactions made by a user 236 with his or her user profile stored in the user profile database 220.

The job postings database 222 includes job postings offered by companies. Each job posting includes job-related information such as any combination of employer, job title, job description, requirements for the job posting, salary and benefits, geographic location, one or more job skills desired, day the job posting was posted, relocation benefits, and the like.

While the database server(s) 226 are illustrated as a single block, one of ordinary skill in the art will recognize that the database server(s) 226 may include one or more such servers. Accordingly, and in one embodiment, the database server(s) 226 implemented by the social networking service are further configured to communicate with the social networking server 212.

The social networking server 212 includes, among other modules, a job search module 228 and a search-parameter-selection module 230, which utilizes a machine-learning model for selecting job-posting search parameters. More details regarding the functionality of these modules is provided below. Each of the modules may be implemented in software, hardware, or any combination of software and hardware.

The network architecture 202 may also include a search engine 234. Although only one search engine 234 is depicted, the network architecture 202 may include multiple search engines 234. Thus, the social networking server 212 may retrieve search results (and, potentially, other data) from multiple search engines 234. The search engine 234 may be a third-party search engine. Examples of the search engine 234 include Bing, Ask, and search engines provided by Google, Yahoo!, Baidu, and AOL.

Figure 3:
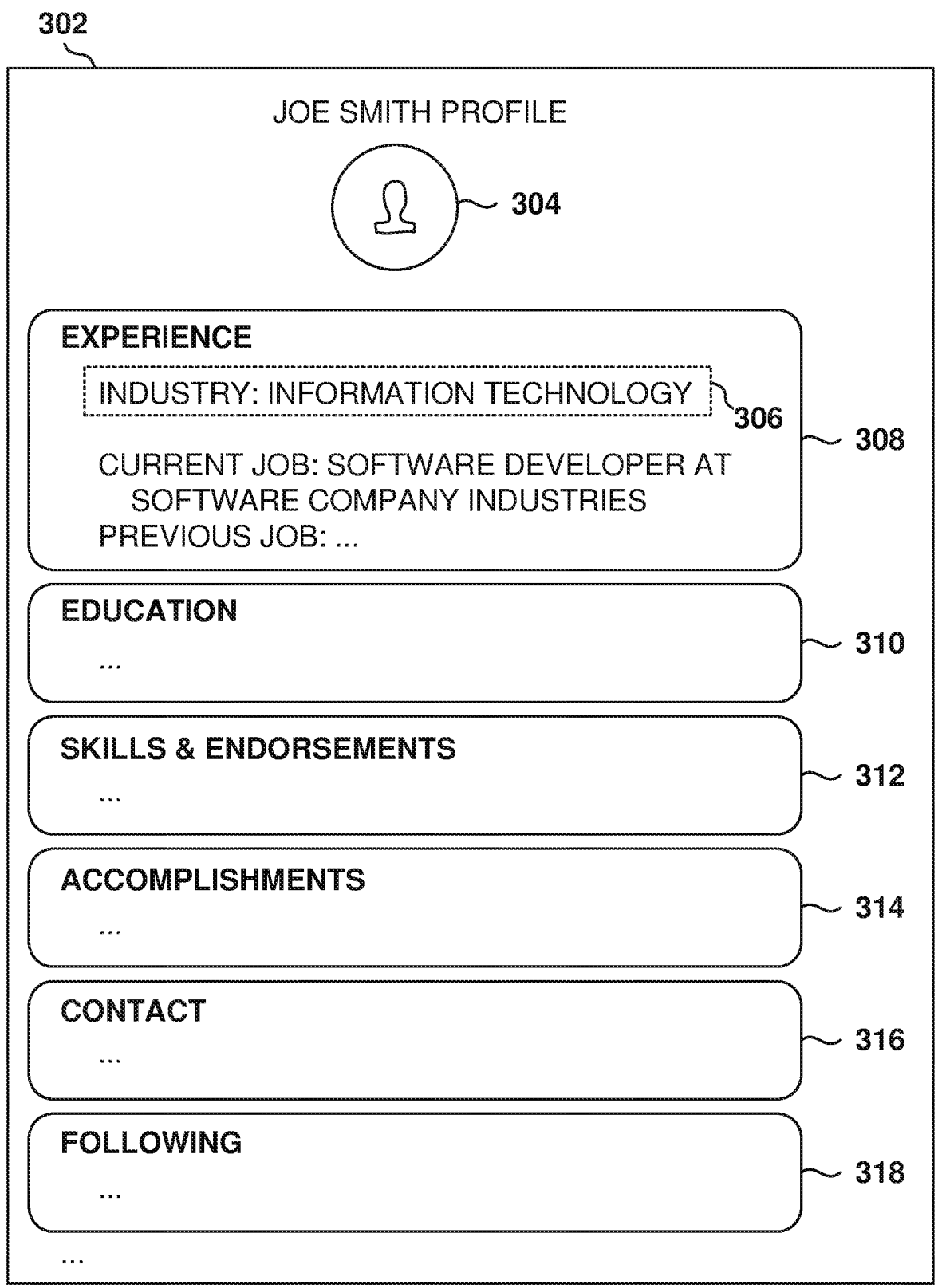
FIG. 3 is a screenshot of a user's profile view, according to some example embodiments.

FIG. 3 is a screenshot of a user's profile view, according to some example embodiments. Each user in the social networking service has a user profile 302, which includes information about the user (e.g., the user 236 of FIG. 2). The user profile 302 is configurable by the user and also includes information based on user activity in the social networking service (e.g., likes, posts read).

In one example embodiment, the user profile 302 may include information in several categories, such as experience 308, education 310, skills and endorsements 312, accomplishments 314, contact information 316, following 318, language, and the like. Skills include professional competences that the user has, and the skills may be added by the user or by other users of the social networking service. Example skills include C++, Java, Object Programming, Data Mining, Machine Learning, Data Scientist, Spanish, and the like. Other users of the social networking service may endorse one or more of the skills and, in some example embodiments, the account is associated with the number of endorsements received for each skill from other users.

The experience 308 category of information includes information related to the professional experience of the user. In one example embodiment, the experience 308 information includes an industry 306, which identifies the industry in which the user works. Some examples of industries configurable in the user profile 302 include information technology, mechanical engineering, marketing, and the like. The user profile 302 is identified as associated with a particular industry 306, and the posts related to that particular industry 306 are considered for inclusion in the user's feed, even if the posts do not originate from the user's connections or from other types of entities that the user explicitly follows. The experience 308 information area may also include information about the current job and previous jobs held by the user.

The education 310 category includes information about the educational background of the user, including educational institutions attended by the user. The skills and endorsements 312 category includes information about professional skills that the user has identified as having been acquired by the user, and endorsements entered by other users of the social networking service supporting the skills of the user. The accomplishments 314 area includes accomplishments entered by the user, and the contact information 316 includes contact information for the user, such as email and phone number. The following 318 area includes the name of entities in the social networking service being followed by the user.

Figure 4:
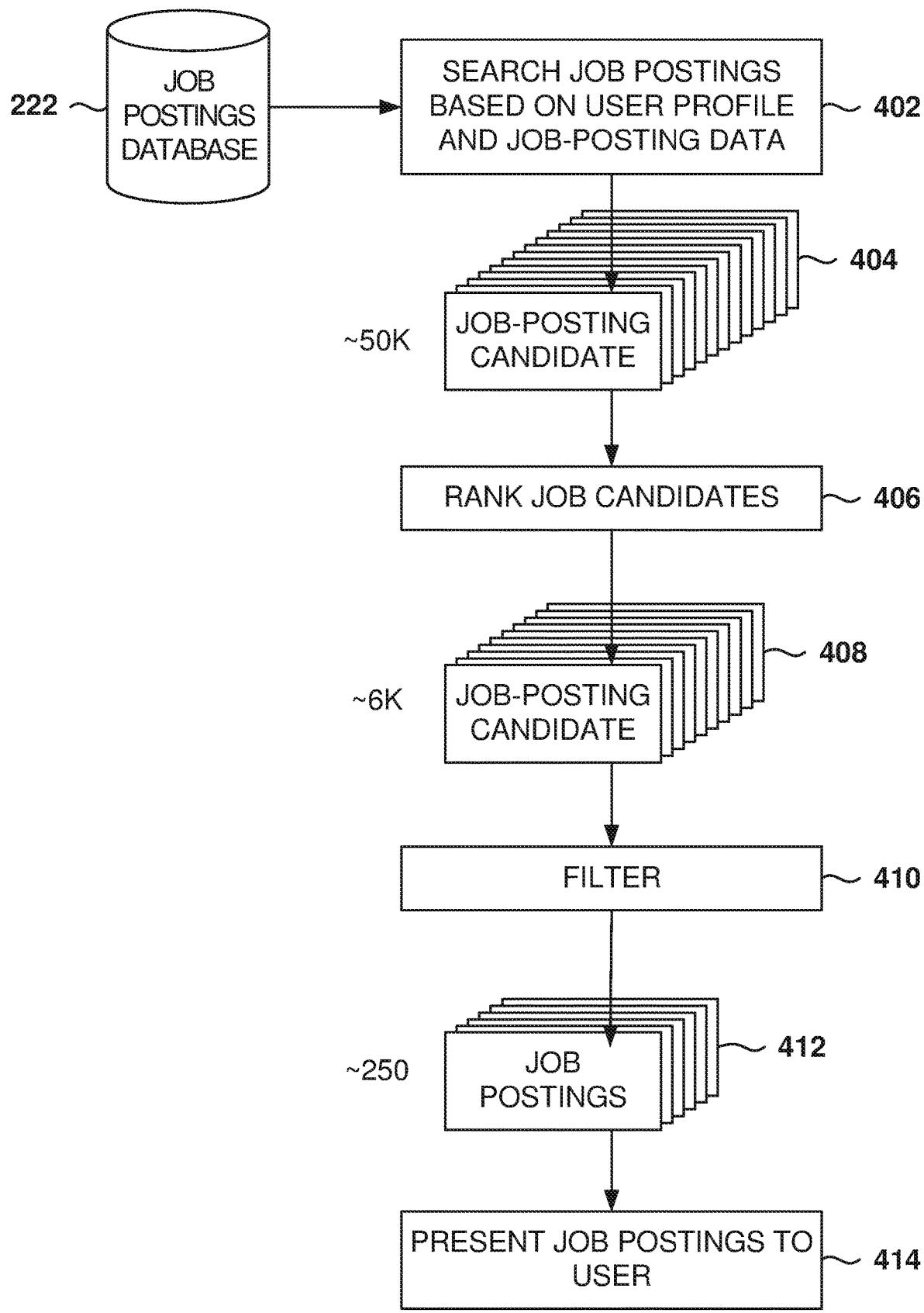
FIG. 4 illustrates a process for finding relevant job postings for a user, according to some example embodiments.

FIG. 4 illustrates a process for finding relevant job postings for a user, according to some example embodiments. Many selection algorithms rely heavily on search parameters used to match information of the user profile. These search parameters may also be referred to herein simply as parameters or metadata. For example, automated jobs recommenders pick job postings that require a user's skills and titles, news feed recommenders pick articles that match topics or connections of the user. Use of these types of parameters to pre-filter the document database is a reason why recommender systems are scalable to search millions of documents quickly. Search parameters are useful because they are easy to index and intuitive (e.g., annotatable, explainable). For new users, search parameters can also help the system jump-start new recommendations (e.g., JYMBII).

When there are many possible parameters, deciding which ones to use is important to make searches quick and effective. For example, a typical user on the social network may have 100 skills and 400 connections or more. Performing searches using all these skills would be slow and require large amounts of computing resources. For example in JYMBII, the average number of retreat documents is around 6000, with a maximum of about 50,000. This large number of documents poses a burden for scoring and ranking each of the job-post candidates.

In particular, the large number of candidate results compromises speed, accuracy, and explainability (e.g., ability to explain to the user why this job posting was selected as a good recommendation for the user). To respond within tight time constraints, a first pass ranker (FPR) faces a dilemma between speed and quality: if it is too complex, the FPR will not finish on time, and if it is not complex enough, the FPR will not filter accurately.

FIG. 4 illustrates a job-post search for JYMBII. The database may have about 300,000 job postings and the goal is to present a small number of those job postings to the user, such as 250 or less. Ranking and scoring all 300,000 job postings would require a lot of time and computing resources, which would make it unfeasible. Therefore, several filtering steps are used to come up with the selected job postings for the user.

At operation 402, a search is performed for job postings based on user profile information and job-posting data, such as, for example, by matching the skills of the member to the skills identified in the job posting. The initial search may provide about 50,000 job-posting candidates 404.

At operation 406, the FPR ranks the job-posting candidates 404 by providing a score to each job-posting candidate 404 and selecting a predetermined number of the top job postings based on their scores. For example, the top 6,000 job postings are selected to generate job-posting candidates 408, but a different number of job postings may be selected, e.g., in the range between 1000 and 20,000; other numbers are also possible.

In some example embodiments, the FPR is Logistic Regressor with 80 features, and although FPR's accuracy is limited, the FPR consumes about 40% of the sorting and ranking time for the search.

At operation 410, the job-posting candidates 408 are filtered (e.g., scored and ranked) to reduce the number of candidate job postings 412 (e.g., around 250 job postings). The filtering at operation 410 may be performed by a machine-learning model that utilizes detailed criteria to match job postings to user profiles.

At operation 414, the selected job postings 412, or a subset thereof, are presented to the user, such as on a display of the machine being used by the user that originated the MIMI operation.

Operation 402 is rather fast because it uses a database query to get the job-posting candidates 408. However, the scalability bottleneck tends to be at operation 406 performed by the FPR, which uses a simple search model, because if a more complex search model were used, the FPR would not finish on time. Additionally, garbage collection may slow down the process as more and more job candidates are retrieved from the database 222. Thus, a simple model is used for the FPR.

It is noted that the embodiments illustrated in FIG. 4 are examples and do not describe every possible embodiment. Other embodiments may utilize different numbers of filtering steps, produce different numbers of results, etc. The embodiments illustrated in FIG. 4 should therefore not be interpreted to be exclusive or limiting, but rather illustrative.

Figure 5:
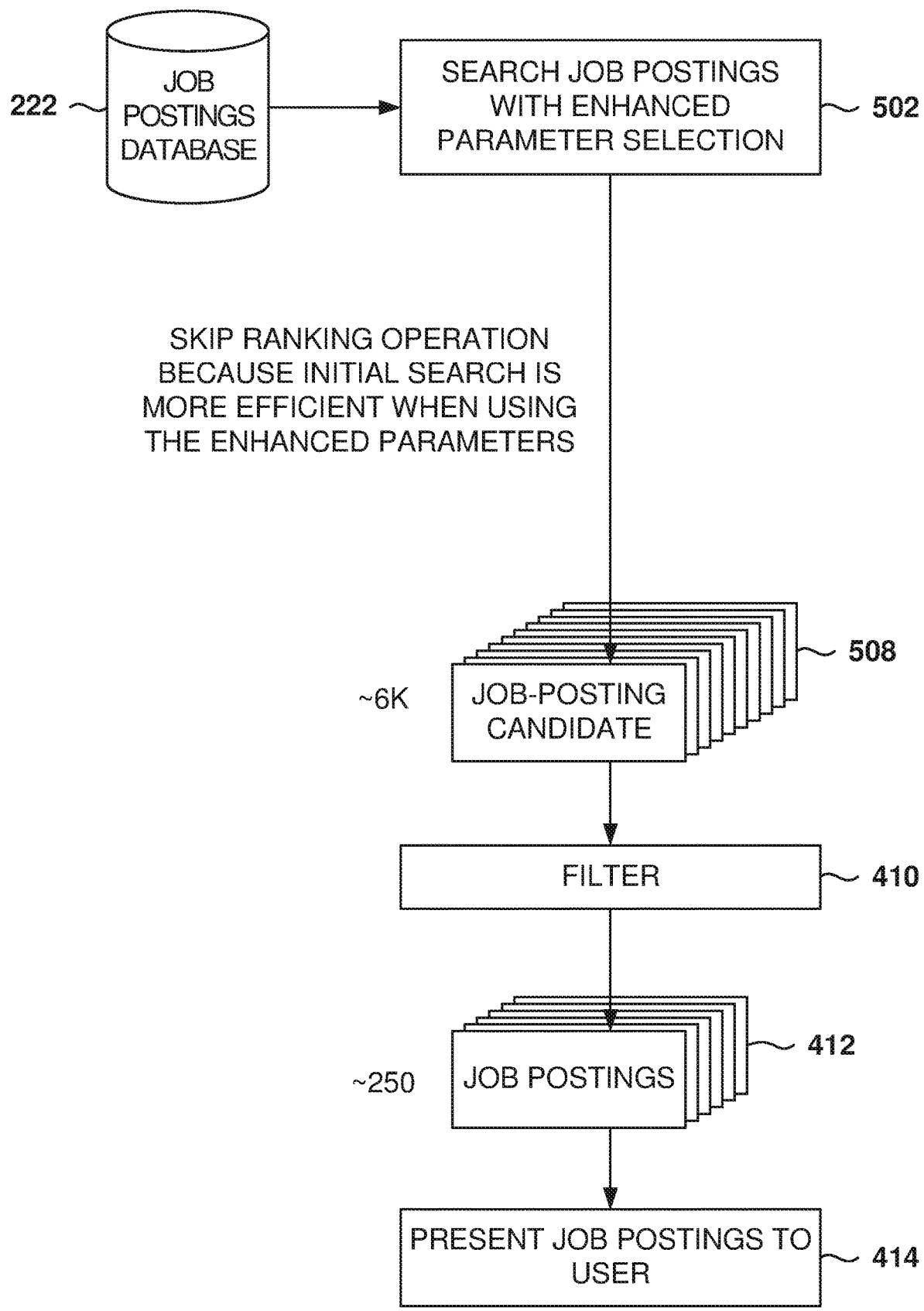
FIG. 5 illustrates an optimized process for finding relevant job postings for a user based on optimized search parameters, according to some example embodiments.

FIG. 5 illustrates an optimized process for finding relevant job postings for a user based on optimized search parameters, according to some example embodiments. In some example embodiments, instead of using the FPR, a reduced number of search parameters is selected, which are then used for the initial search operation 502. That is, the search is performed with and enhanced set of search parameters.

This way, the initial search operation 502 provides better results and the FPR operation is eliminated. Thus, the initial search operation 502 generates a smaller number of job-posting candidates 508 (e.g., about 6000 job postings).

The idea is that some search parameters are more relevant than others. For example, for a data scientist, the skill of knowing C++ will be more relevant than the skill of speaking Chinese. Further, if the data scientist has the skill "programmer," this skill will not be very helpful in filtering jobs because it applies to many types of different programming jobs, such as engineering, developers, etc.

Using a more restricted parameter set is expected to improve speed (e.g., less jobs being fetched, less scoring time needed), accuracy (e.g., focusing on the most relevant parameters will produce better results) and explainability (e.g., fetching criteria may be presented to users because it is clear what search parameters were utilized).

Thus, the initial search operation 502 may directly obtain about 6,000 job-posting candidates 508 without having to perform two separate operations: database retreat followed by FDR. Further, the filtering 410 is performed as described with reference to FIG. 4, and the results are presented (operation 414) to the user.

Comparing the methods of FIGS. 4 and 5, when using FPR, the initial search may include 100 parameters, while when using enhanced parameter selection, the initial search of the database may include 50 parameters; that is, the database command is a read with 50 identified parameters. Thus, the number of parameters is reduced, but it is still a database fetch operation.

During experimentation, using enhanced parameters has been shown to produce better results than when using the FDR. Because the results are more accurate for the user, the users of the online service generate more job applications. Further, because fewer jobs are being fetched, latency and service cost are reduced.

In some experiments, the number of job applications increased about 8% when using enhanced parameters, the latency for longest queries to serve was reduced about 38%, and serving cost was reduced by about 25%.

Figure 6:
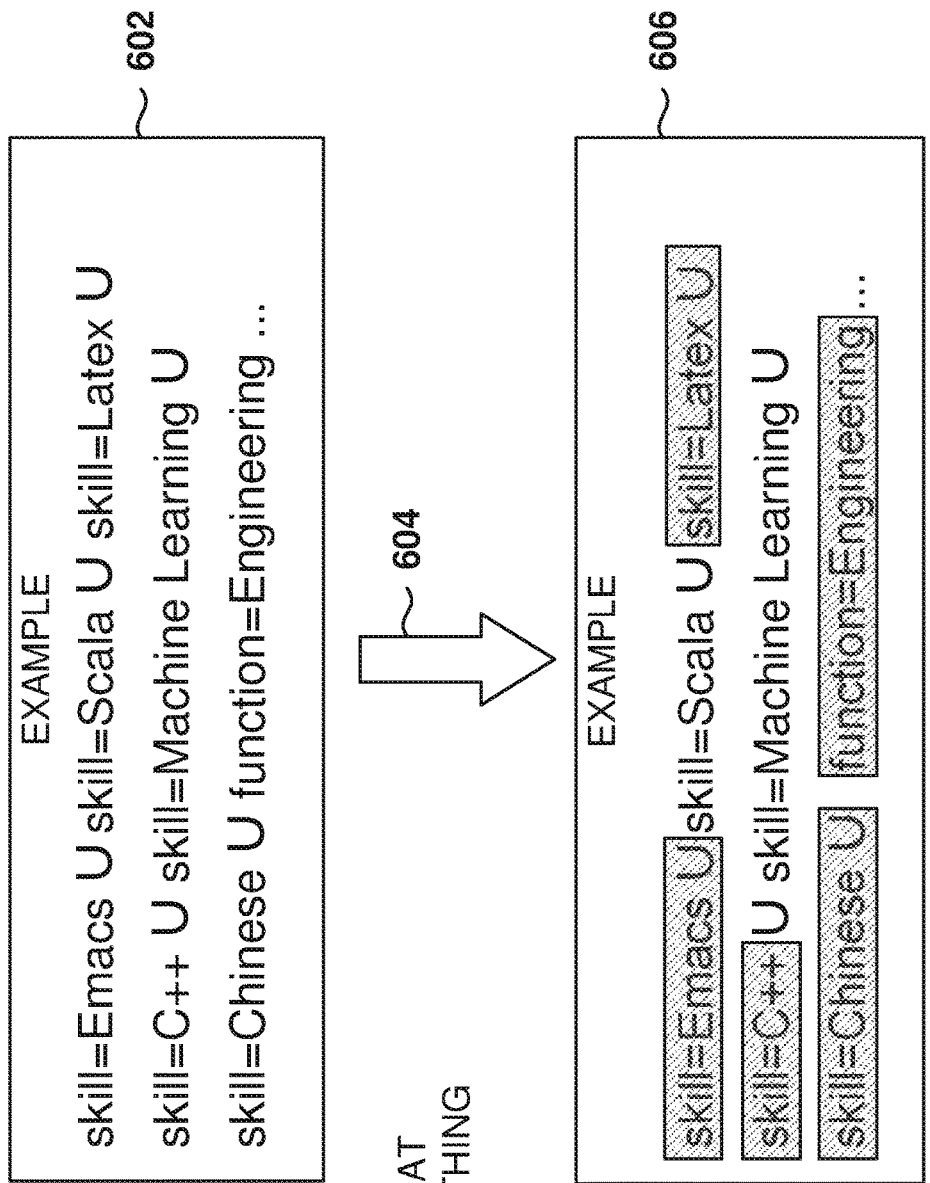
FIG. 6 illustrates an example for selecting search parameters, according to some example embodiments.

FIG. 6 illustrates an example for selecting search parameters, according to some example embodiments. As discussed above, the initial search when using the FDR includes 100 parameters or more. Query 602 shows some of the parameters for an engineer.

The parameters include several skills (e.g., Emacs, Scala, Latex, C++, Machine Learning, Chinese) and functional area (e.g., Engineering). In some example embodiments, the parameters that contribute nothing or very little to the filtering of job-posting candidates are eliminated (operation 604).

The resulting query 606 eliminates several parameters from the search, including skills that are too common or irrelevant for the user, and the function of Engineering because it is very common. Thus, the initial search includes a predetermined number of the most relevant parameters. The number of relevant parameters selected is referred to herein as shutter speed, because, like the shutter speed in a camera regulates the taking of images, the shutter speed for searching regulates the accuracy and speed of the search.

Figure 7:
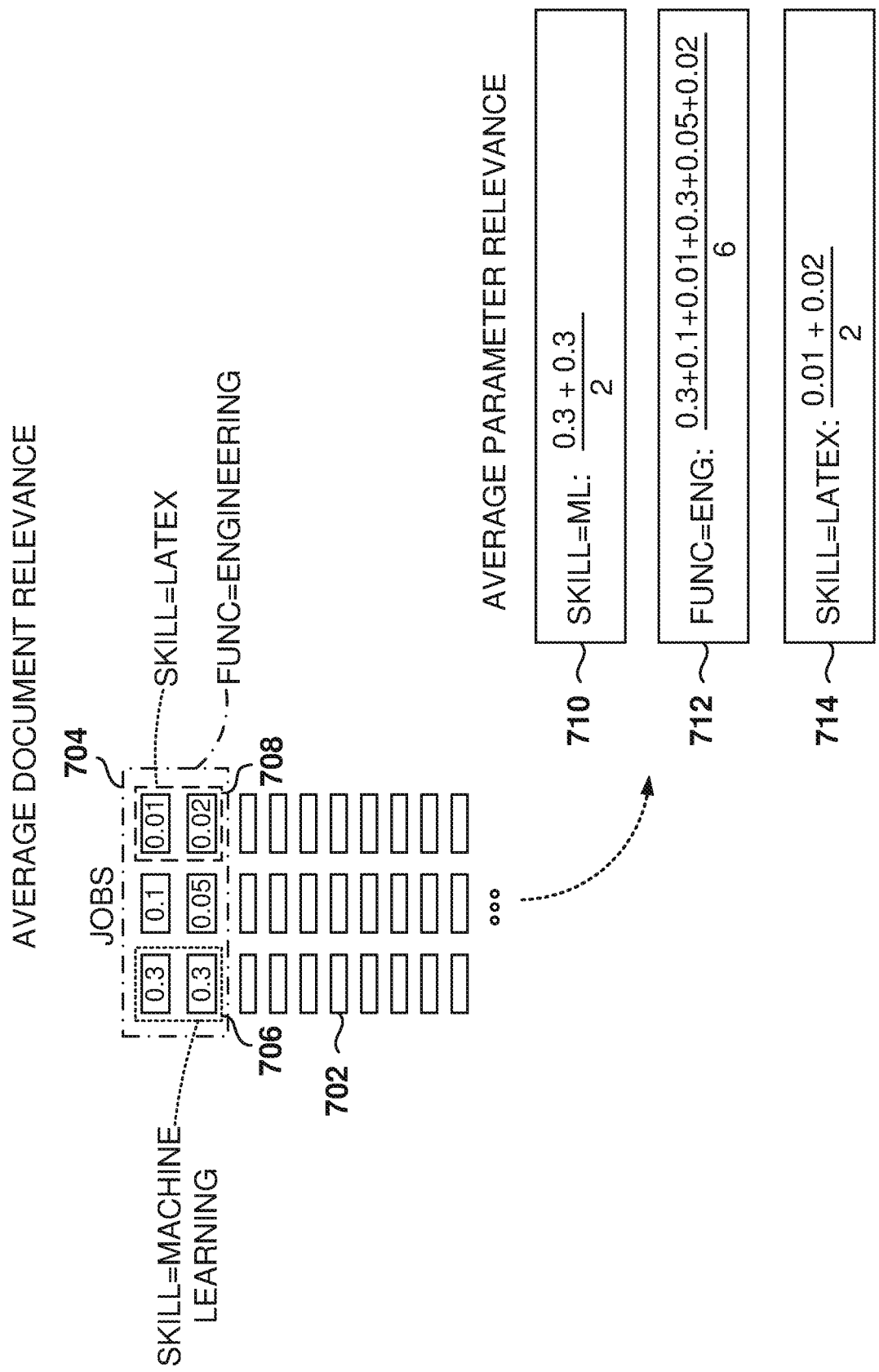
FIG. 7 illustrates a process for identifying average document relevance, according to some example embodiments.

FIG. 7 illustrates a process for identifying average document relevance, according to some example embodiments. One goal is to generate scores for the parameters in order to rank the parameters to select the best ones for the search queries.

Some scoring mechanisms are not adequate for ranking parameters. For example, confidence measurements capture how sophisticated a member is for a skill, job, or function. However, these measurements will favor skills such as Chinese or Latex that may not be very relevant for a data scientist. A skill such as Scala is more relevant to data scientists but may have a lower confidence measurement on the profile.

Further, inverse document frequency (IDF), the frequency of parameters among jobs, captures how specific a parameter is appropriate for the user. IDF will favor rare skills (e.g., LaTeX, Emacs) but will disfavor important skills such as machine learning and Scala. Further yet, popularity of a parameter captures what is available in the market. Popularity favors skills with high demand or high supply such as C++, but rarer parameters such as machine learning will be less favored.

In some example embodiments, a machine-learning model is used to leverage user activity data (e.g., job applications) to customize a scoring mechanism, with supervised learning.

In some solutions, supervised learning for candidate selection utilizes a special index setup which enables k-nearest neighbor (kNN) search. In some example embodiments, a customized supervised learning framework is used to make parameter statistics computation-efficient. In some example embodiments, the statistics utilized are the average probability that a user applies for a given job posting for those job postings that match a certain parameter.

FIG. 7 illustrates an example for calculating the parameter relevance. For a given user, a machine-learning model assigns a probability to each job representing the likelihood that the user will apply for the job.

In the example, the probabilities that the user applies for a plurality of jobs 702 are calculated (e.g., 0.3, 0.1, 0.01, 0.3, 0.05, 0.02). Each of the jobs 702 will match zero or more parameters: jobs 706 match the skill machine learning, jobs 708 match the skill LaTeX, and jobs 704 match the function engineering.

The average parameter relevance is then calculated for the jobs that match a given parameter. For example, the average parameter relevance 710 for the skill machine learning is 0.3 (average of 0.3 and 0.3), the average parameter relevance 712 for the function engineering is 0.13 (average of 0.3, 0.1, 0.01, 0.3, 0.05, and 0.02), and the average parameter relevance 714 for the skill LaTeX is 0.015 (average of 0.01 and 0.02).

Machine learning has the highest average parameter relevance 710, and the average parameter relevance 714 for the skill LaTeX is the lowest because it is not a skill that has much effect on job applications for data scientists. The average parameter relevance 712 for the function engineering is mediocre because "engineering" matches both highly relevant jobs as well many irrelevant jobs.

Once the parameters are ranked, the top n parameters are selected for the search operation 502 of FIG. 5. Ranking and selecting parameters based on the average parameter relevance helps improve the average relevance of documents going into the later ranking processes. The idea is that the later ranking processes focus on selecting the best parameters among good ones, instead of filtering good from bad.

Figure 8:
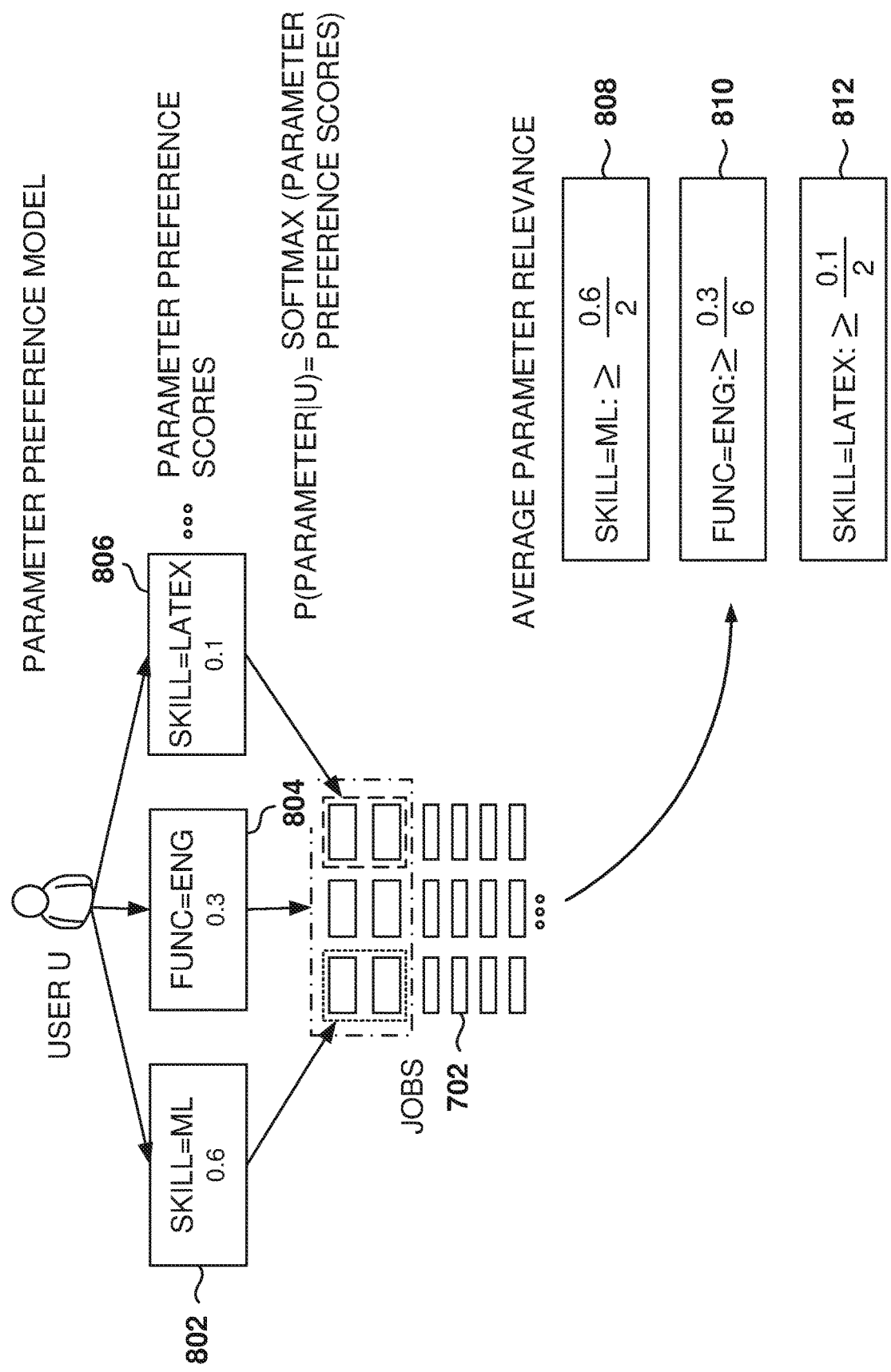
FIG. 8 illustrates the use of a machine-learning program for calculating parameter preference, according to some example embodiments.

FIG. 8 illustrates the use of a machine-learning program for calculating parameter preference, according to some example embodiments. In the process described with reference to FIG. 7, computing averages is resource intensive because it requires summing up probabilities for a large set of documents.

In some example embodiments, a different model is used in order to avoid having to perform the sum to calculate the average. The assumption is that the probabilities for a given parameter will be very similar for all matching jobs; this way, the addition becomes a multiplication by multiplying the number of matching jobs to the average probability. This multiplication is much more efficient with respect to the use of computing resources.

An assumption for the model is that users tend to prefer certain parameters over others when searching. For example, a user looking for machine learning engineer jobs may treat TensorFlow skill as a key parameter; when several jobs meet this parameter, the user will likely apply to any of the matching jobs. This may not be completely true because there are often other interleaving parameters that decide which job a member actually likes. However, this simplification allows the modeling to focus on a parameter's relevance as a whole, and allows simpler computation for average document relevance.

In some example embodiments, the model is formalized into an extreme multi-class classifier as a two-step generative model. In this model, a user decides which job to apply for in two operations: first, deciding which metadata is the key factor for job seeking, and second, from all the matching job postings, randomly picking one to apply for.

Thus, the probability Pr(J|U) that a user U applies for a job posting J is expressed as follows:

$$Pr(J|U) = \sum_P Pr(P|U)\frac{1}{|D(P)|}$$

Here, P is a parameter, the parameter preference score Pr(P|U) is the probability of the parameter being a preferred parameter for the given user, D(P) is the set of job postings matching P, and |D(P)| is the number of job postings in D(P). If the user does not match a given parameter (e.g., the user does not have the skill associated with the parameter), then Pr(P|U) is zero.

A model is used to calculate the parameter preference score Pr(P|U) with supervised training. The model enables the quick estimation of the sum of the average parameter relevance for a given parameter. Then, to calculate the average parameter relevance, Pr(P|U) is divided by the number of jobs that match the parameter, which is |D(P)|.

In some example embodiments, softmax is used to normalize the probabilities for all the parameters. Thus, Pr(P|U) is the softmax of the parameter preference scores. The softmax function takes as input a vector of K real numbers, and normalizes the vector into a probability distribution consisting of K probabilities. That is, prior to applying softmax, some vector components could be negative, greater than one, and might not sum to 1. After applying softmax, each component will be in the interval (0,1) and the components will add up to 1.

The benefit of this model is that it is not necessary to compute all the scores for every job posting that match with this parameter. After the model provides the sum, then the sum is divided by the number of matching job postings.

In the illustrated example, the parameter preference score 802 for the machine learning skill is 0.6, the parameter preference score 804 for the engineering function is 0.3, and the parameter preference score 806 for the LaTeX skill is 0.1.

The average parameter relevance is then calculated for the jobs that match a given parameter. For example, the average parameter relevance 808 for the skill machine learning is 0.3 (0.6 divided by 2, the number of matching job postings), the average parameter relevance 810 for the function engineering is 0.05 (0.3 divided by 6), and the average parameter relevance 812 for the skill LaTeX is 0.05 (0.1 divided by 2). Once the parameters are ranked, the top n parameters are selected for the search operation 502 of FIG. 5.

Figure 9:
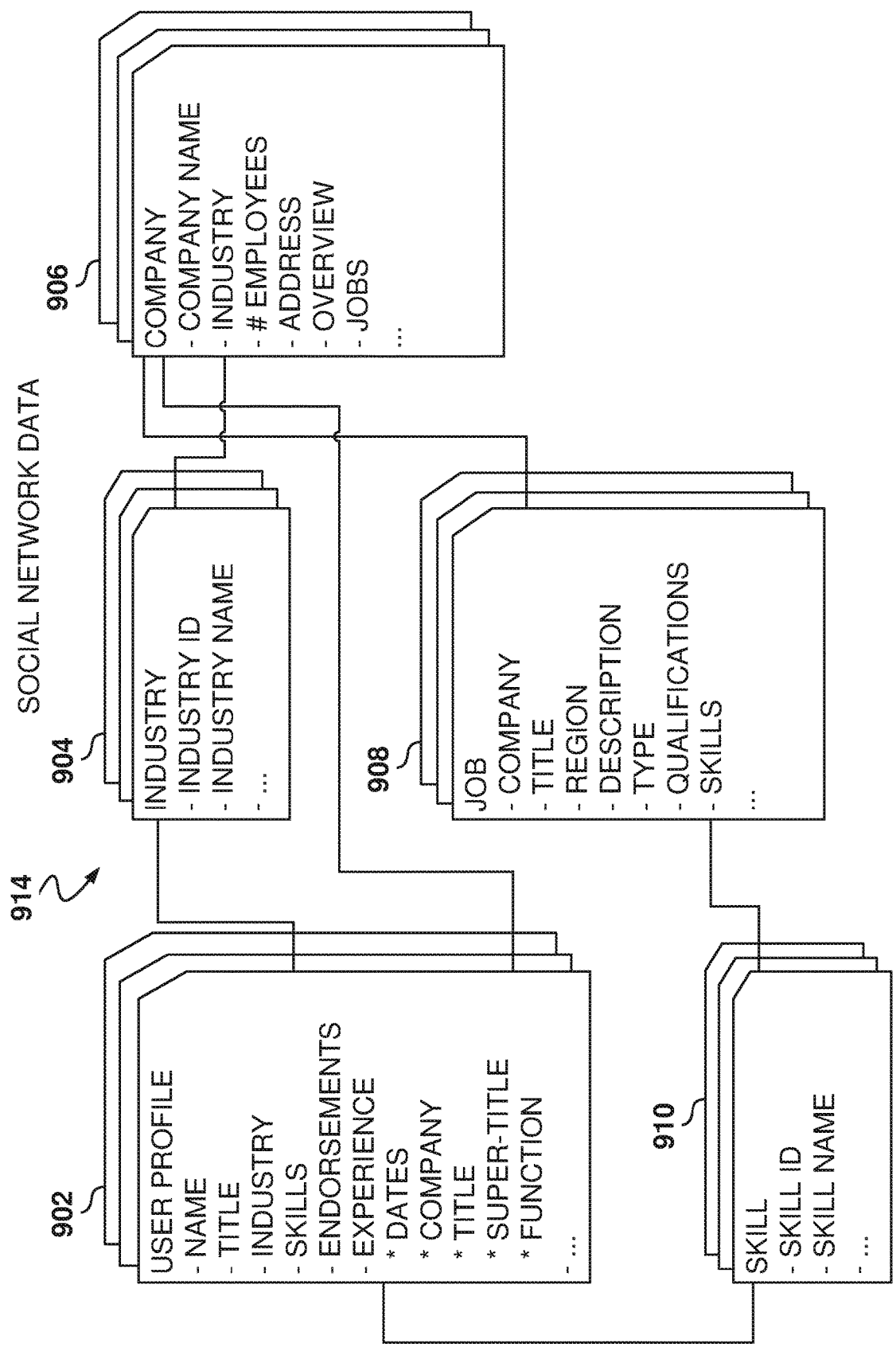
FIG. 9 illustrates data structures for storing job and user information, according to some example embodiments.

FIG. 9 illustrates data structures for storing social network data 914, according to some example embodiments. Each user in the social network has a member profile 902, which includes information about the user. The member profile 902 is configurable by the user and includes information about the user and about user activity in the social network (e.g., items liked, posts read, jobs applied).

In one example embodiment, the member profile 902 may include information in several categories, such as experience, education, skills and endorsements, accomplishments, contact information, following, and the like. Skills include professional competences that the member has, and the skills may be added by the member or by other members of the social network. Example skills include C++, Java, Object Programming, Data Mining, Machine Learning, Data Scientist, and the like. Other members of the social network may endorse one or more of the skills and, in some example embodiments, the account is associated with the number of endorsements received for each skill from other members.

The member profile 902 includes member information, such as name, title (e.g., job title), industry (e.g., legal services), geographic region, jobs, skills and endorsements, and so forth. In some example embodiments, the member profile 902 also includes job-related data, such as employment history, jobs previously applied to, or jobs already suggested to the member (and how many times the job has been suggested to the member). The experience information includes information related to the professional experience of the user, and may include, for each job, dates, company, title, super-title, functional area, industry, etc. Within member profile 902, the skill information is linked to skill data 910, the employer information is linked to company data 906, and the industry information is linked to industry data 904. Other links between tables may be possible.

The skill data 910 and endorsements includes information about professional skills that the user has identified as having been acquired by the user, and endorsements entered by other users of the social network supporting the skills of the user. Accomplishments include accomplishments entered by the user, and contact information includes contact information for the user, such as email and phone number.

The industry data 904 is a table for storing the industries identified in the social network. In one example embodiment, the industry data 904 includes an industry identifier (e.g., a numerical value or a text string), and an industry name, which is a text string associated with the industry (e.g., legal services).

In one example embodiment, the company data 906 includes company information, such as company name, industry associated with the company, number of employees, address, overview description of the company, job postings, and the like. In some example embodiments, the industry is linked to the industry data 904.

The skill data 910 is a table for storing the different skills identified in the social network. In one example embodiment, the skill data 910 includes a skill identifier (ID) (e.g., a numerical value or a text string) and a name for the skill. The skill identifier may be linked to the member profile 902 and job data 908.

In one example embodiment, job data 908 includes data for jobs posted by companies in the social network. The job data 908 includes one or more of a title associated with the job (e.g., software developer), a company that posted the job, a geographic region for the job, a description of the job, job type (e.g., full time, part time), qualifications required for the job, and one or more skills. The job data 908 may be linked to the company data 906 and the skill data 910.

In some embodiments, the social network imports jobs from other websites, such as the jobs page of the company, and those job postings may include an employment status (e.g., part-time, in-house). This information may also be used as features for the machine-learning model.

Additionally, some members may enter salary data in their profiles, and the salary data may be entered as hourly or salaried. This signal may also be used as a feature for the machine-learning model.

It is noted that the embodiments illustrated in FIG. 9 are examples and do not describe every possible embodiment. Other embodiments may utilize different data structures, fewer data structures, combine the information from two data structures into one, add additional or fewer links among the data structures, and the like. The embodiments illustrated in FIG. 9 should therefore not be interpreted to be exclusive or limiting, but rather illustrative.

Figure 10:
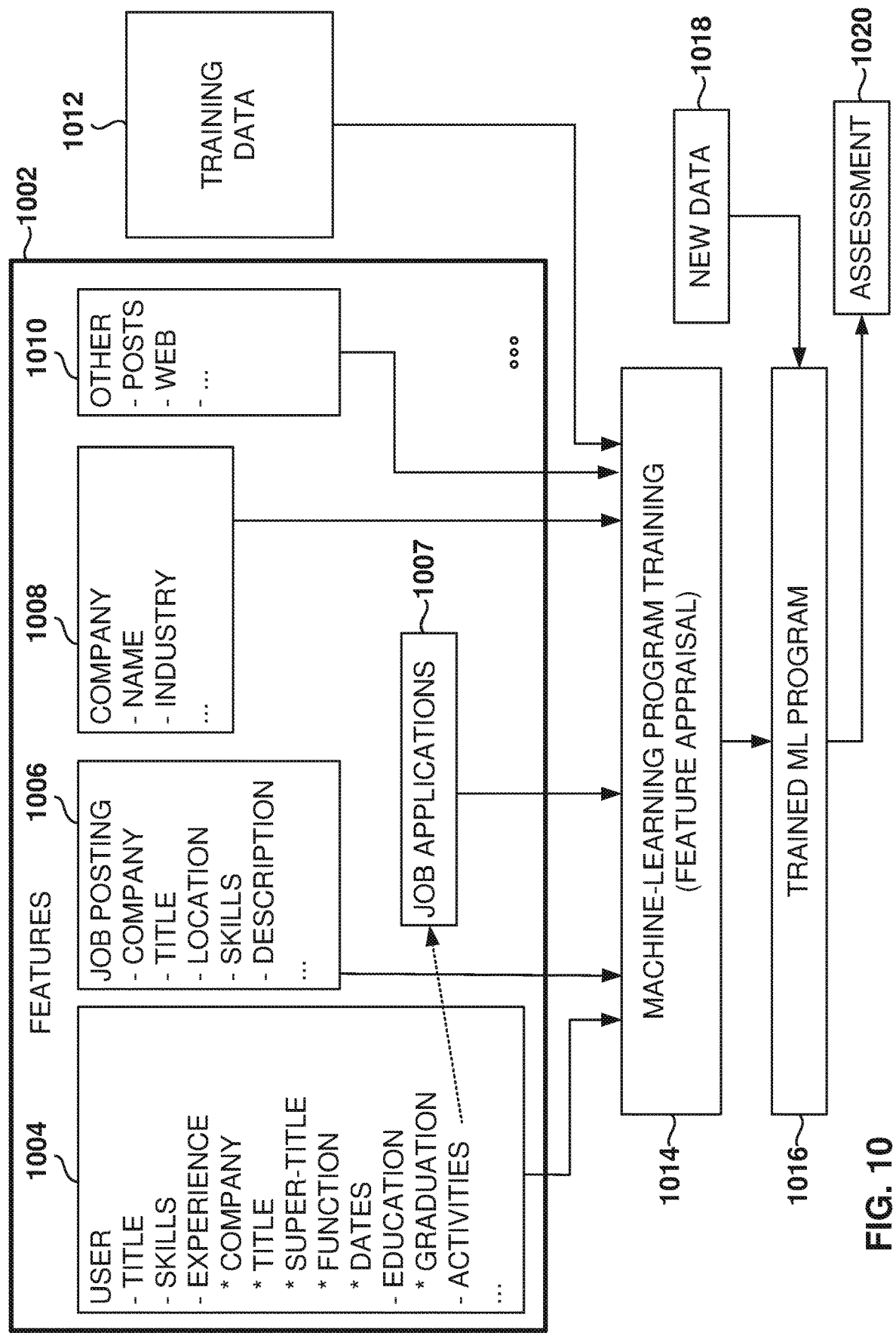
FIG. 10 illustrates the training and use of a machine-learning program, according to some example embodiments.

FIG. 10 illustrates the training and use of a machine-learning program, according to some example embodiments. In some example embodiments, machine-learning programs (MLP), also referred to as machine-learning algorithms or tools, are utilized to perform operations associated with searches, such as job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 1012 in order to make data-driven predictions or decisions expressed as outputs or assessments 1020. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), deep neural networks (DNN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). The machine-learning algorithms utilize the training data 1012 to find correlations among identified features 1002 that affect the outcome.

The machine-learning algorithms utilize features 1002 for analyzing the data to generate assessments 1020. A feature 1002 is an individual measurable property of a phenomenon being observed. The concept of feature is related to that of an explanatory variable used in statistical techniques such as linear regression. Choosing informative, discriminating, and independent features is important for effective operation of the MLP in pattern recognition, classification, and regression. Features may be of different types, such as numeric, strings, and graphs.

In one example embodiment, the features 1002 may be of different types and may include one or more of user 1004, which includes job applications 1007; job-posting features 1006; company features 1008; and other features 1010 (user posts, web activity, followed companies, etc.). The features 1002 may include all or part of the social network data 914, as described above with reference to FIG. 9. The data sources include member standardized data, jobs standardized data, member connections, member employment preferences, job views, job applied, job information, salary information, etc.

The machine-learning algorithms utilize the training data 1012 to find correlations among the identified features 1002 that affect the outcome or assessment 1020. In some example embodiments, the training data 1012 includes known data for one or more identified features 1002 and one or more outcomes, such as the job applications, user profile, job postings, etc.

With the training data 1012 and the identified features 1002, the machine-learning tool is trained at operation 1014. The machine-learning tool appraises the value of the features 1002 as they correlate to the training data 1012. The result of the training is the trained machine-learning program 1016.

When the machine-learning program 1016 is used to perform an assessment, new data 1018 is provided as an input to the trained machine-learning program 1016, and the machine-learning program 1016 generates the assessment 1020 as output. For example, the machine-learning program may be used to provide a ranking score for a job post, and the ranking score may be used to sort the data results before presentation to the user. Further, another machine-learning program, referred to herein as the shutter speed machine-learning program, may be used to calculate the parameter preference scores, as described above.

In some example embodiments, part of the data (e.g., 90%) is used to train the machine-learning program and the rest is reserved for testing and validation. In some example embodiments, the model output is evaluated by sampling results and manually validating these results. The results may be evaluated by human judges or may be evaluated by asking members of the social network directly to confirm the validity of the predictions, or by asking the employers to confirm the predictions for the given title or titles. By evaluating the sample results, it is possible to determine the accuracy of the predictions by the model.

In some example embodiments, the shutter speed machine-learning program is used for calculating parameter scores. Another program is used for counting the jobs matching a parameter. In some implementation, the number of parameters may reach 50,000 or more.

Figure 11:
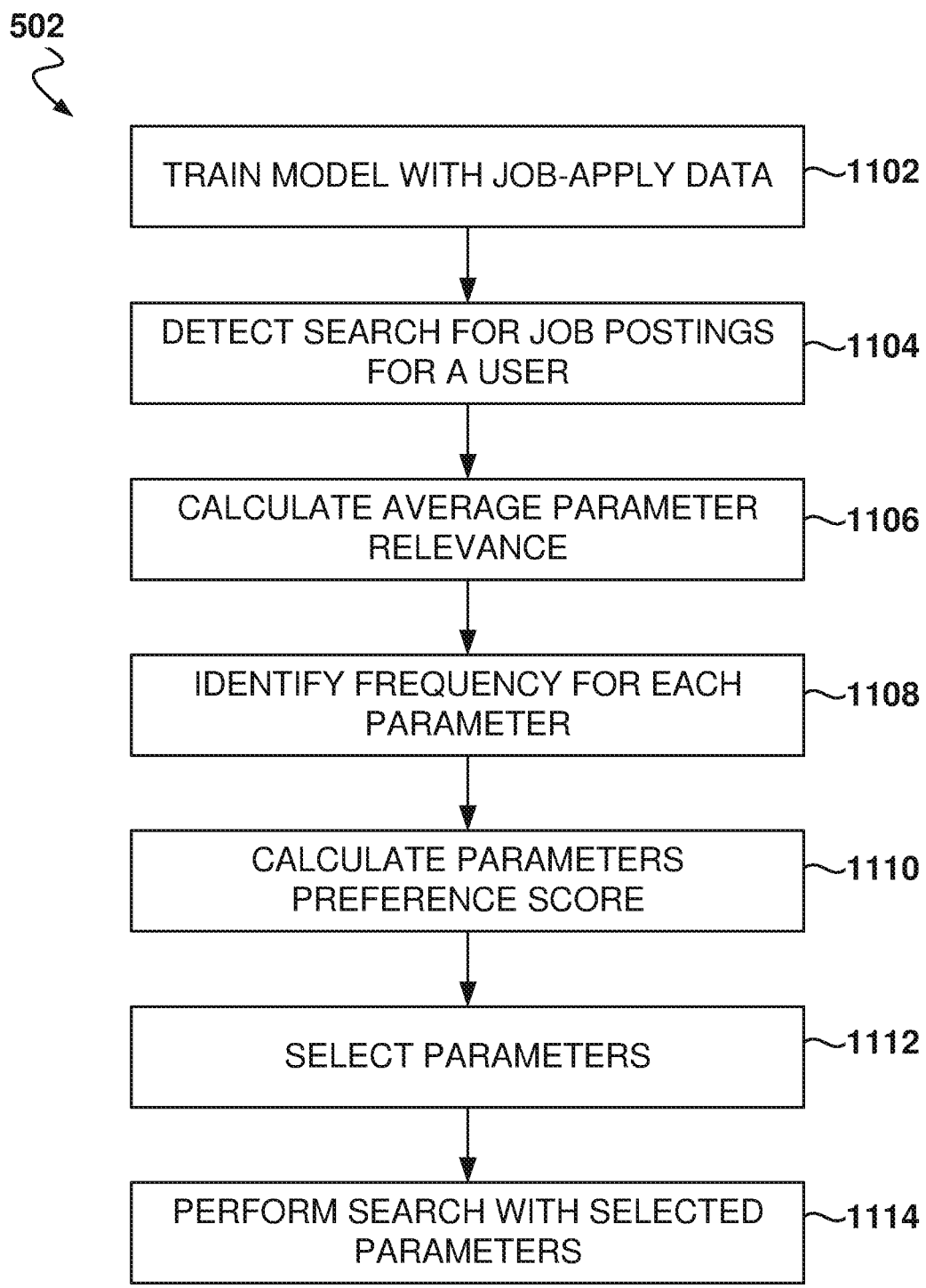
FIG. 11 is a flowchart of a method for performing a search with preferred parameters, according to some example embodiments.

FIG. 11 is a flowchart of a method for performing operation 502, which is the initial search operation with enhanced parameter selection, according to some example embodiments. While the various operations in this flowchart are presented and described sequentially, one of ordinary skill will appreciate that some or all of the operations may be executed in a different order, be combined or omitted, or be executed in parallel.

At operation 1102, the shutter speed machine-learning program is trained with job applications data and other social network data.

From operation 1102, the method flows to operation 1104 where a search for job postings is detected. The search may be originated by the system, as in JYMBII, or may be originated by a user entering a search query.

At operation 1106, the shutter speed machine-learning program is used to calculate the average parameter relevance.

From operation 1106, the method flows to operation 1108 where the frequency for each of the parameters is identified.

At operation 1110, the preference scores for the parameters are calculated. At operation 1112, a predefined number of parameters are selected based on the preference scores (e.g., top 10 parameters, top 20 parameters, top 50 parameters).

At operation 1114, the search for job postings is performed utilizing the selected parameters.

Figure 12:
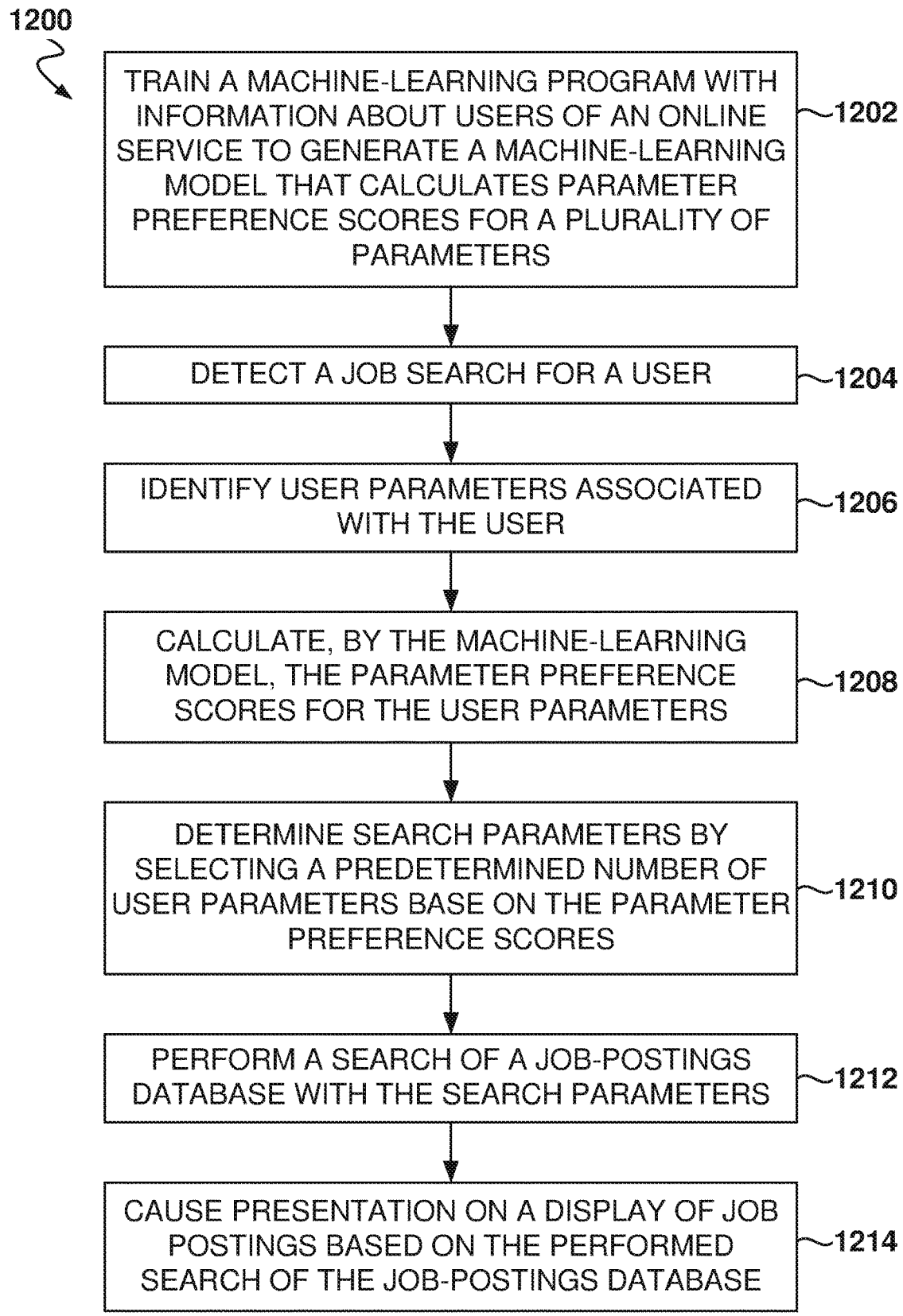
FIG. 12 is a flowchart of a method for search optimization based on relevant-parameter selection, according to some example embodiments.

FIG. 12 is a flowchart of a method 1200 for search optimization based on relevant-parameter selection, according to some example embodiments. While the various operations in this flowchart are presented and described sequentially, one of ordinary skill will appreciate that some or all of the operations may be executed in a different order, be combined or omitted, or be executed in parallel.

At operation 1202, one or more processors train a machine-learning program with information about users of an online service to generate a machine-learning model that calculates parameter preference scores for a plurality of parameters.

From operation 1202, the method 1200 flows to operation 1204 for detecting, by the one or more processors, a job search for a user.

At operation 1206, the one or more processors identify user parameters associated with the user, and at operation 1208, the machine-learning model calculates the parameter preference scores for the user parameters.

From operation 1208, the method 1200 flows to operation 1210 for determining, by the one or more processors, search parameters by selecting a predetermined number of user parameters base on the parameter preference scores.

From operation 1210, the method flows to operation 1212 where the one or more processors perform a search of a job-postings database with the search parameters.

At operation 1214, the one or more processors cause presentation on a display of job postings based on the performed search of the job-postings database.

In one example, the parameter preference score is a probability of the parameter being a preferred parameter for the user.

In one example, determining the search parameters further comprises: determining, for each user parameter, a number of job postings that match the user parameter; calculating, for each user parameter, an average parameter relevance by dividing the parameter preference score by the number of job postings matching the user parameter; and selecting the search parameters based on the average parameter relevance.

In one example, the machine-learning program is trained with information about users of the online service, the information comprising job applications submitted by the users of the online service, and user profile information.

In one example, the method 1200 further comprises, before presenting the job postings, filtering results of the search of the job-postings database.

In one example, the filtering is performed by another machine-learning model based on the user information and information of the job postings.

In one example, the search of the job-postings database comprises a database query that includes a logical AND of matching the selected parameters.

In one example, identifying the user parameters comprises determining which from the plurality of parameters matches information about the user.

In one example, the plurality of parameters includes skill parameters, title parameters, and functional area parameters.

In one example, detecting the job search for the user comprises creating the job search, without user explicit request, to determine possible job postings that match profile information of the user.

Another general aspect is for a system that includes a memory comprising instructions and one or more computer processors. The instructions, when executed by the one or more computer processors, cause the one or more computer processors to perform operations comprising: training, by one or more processors, a machine-learning program with information about users of an online service to generate a machine-learning model that calculates parameter preference scores for a plurality of parameters; detecting, by the one or more processors, a job search for a user; identifying, by the one or more processors, user parameters associated with the user; calculating, by the machine-learning model, the parameter preference scores for the user parameters; determining, by the one or more processors, search parameters by selecting a predetermined number of user parameters base on the parameter preference scores; performing, by the one or more processors, a search of a job-postings database with the search parameters; and causing, by the one or more processors, presentation on a display of job postings based on the performed search of the job-postings database.

In yet another general aspect, a machine-readable storage medium (e.g., a non-transitory storage medium) includes instructions that, when executed by a machine, cause the machine to perform operations comprising: training, by one or more processors, a machine-learning program with information about users of an online service to generate a machine-learning model that calculates parameter preference scores for a plurality of parameters; detecting, by the one or more processors, a job search for a user; identifying, by the one or more processors, user parameters associated with the user; calculating, by the machine-learning model, the parameter preference scores for the user parameters; determining, by the one or more processors, search parameters by selecting a predetermined number of user parameters base on the parameter preference scores; performing, by the one or more processors, a search of a job-postings database with the search parameters; and causing, by the one or more processors, presentation on a display of job postings based on the performed search of the job-postings database.

The number K of parameters selected for the search is tunable by the system administrators. If the number of parameters is small (e.g., ten), then the search will be fast, but some relevant job postings may be lost. If K is too big, then the search will be slower and the number of results will be greater.

In some experiments, different values of K were tested, such as 10, 20, and 50. With a K of 20, result accuracy was high and the search was fast, but other values of K were also suitable for the first pass search.

In some cases, if K is too small, the number of search results may be small, smaller than 6,000, for example. In some embodiments, the smaller number of parameters are passed to the next filtering operations, and in other example embodiments, a new search is performed with a higher value of K.

Further, if the search becomes slow, K is reduced to speed up the search and reduce the number of initial job-posting candidates.

Further yet, in some example embodiments, if the results are greater than a predetermined number, only the predetermined number of the job-posting candidates are selected, such as selecting 6,000 job postings. In some example embodiments, the 6,000 job postings with the latest posting date are selected.

Figure 13:
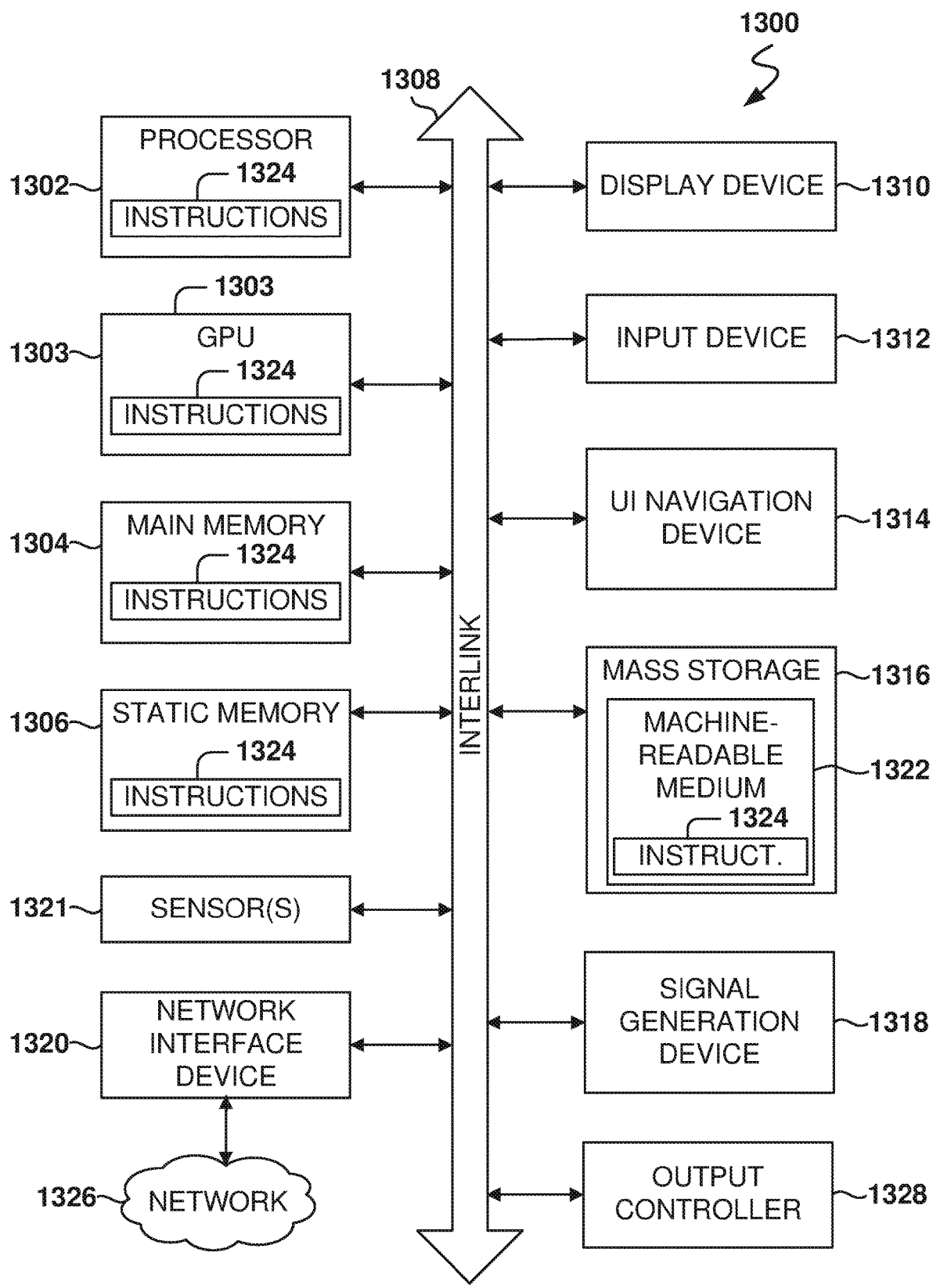
FIG. 13 is a block diagram illustrating an example of a machine upon or by which one or more example process embodiments described herein may be implemented or controlled.

FIG. 13 is a block diagram illustrating an example of a machine 1300 upon or by which one or more example process embodiments described herein may be implemented or controlled. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in a peer-to-peer (P2P) (or other distributed) network environment. Further, while only a single machine 1300 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1300 may include a hardware processor 1302 (e.g., a central processing unit (CPU), a hardware processor core, or any combination thereof), a graphics processing unit (GPU) 1303, a main memory 1304, and a static memory 1306, some or all of which may communicate with each other via an interlink (e.g., bus) 1308. The machine 1300 may further include a display device 1310, an alphanumeric input device 1312 (e.g., a keyboard), and a user interface (UI) navigation device 1314 (e.g., a mouse). In an example, the display device 1310, alphanumeric input device 1312, and UI navigation device 1314 may be a touch screen display. The machine 1300 may additionally include a mass storage device (e.g., drive unit) 1316, a signal generation device 1318 (e.g., a speaker), a network interface device 1320, and one or more sensors 1321, such as a Global Positioning System (GPS) sensor, compass, accelerometer, or another sensor. The machine 1300 may include an output controller 1328, such as a serial (e.g., universal serial bus (USB)), parallel, or other wired or wireless (e.g., infrared (IR), near field communication (NFC)) connection to communicate with or control one or more peripheral devices a printer, card reader).

The mass storage device 1316 may include a machine-readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, within the hardware processor 1302, or within the GPU 1303 during execution thereof by the machine 1300. In an example, one or any combination of the hardware processor 1302, the GPU 1303, the main memory 1304, the static memory 1306, or the mass storage device 1316 may constitute machine-readable media.

While the machine-readable medium 1322 is illustrated as a single medium, the term "machine-readable medium" may include a single medium, or multiple media, (e.g., a centralized or distributed database, and/or associated caches and servers) configured to store the one or more instructions 1324.

The term "machine-readable medium" may include any medium that is capable of storing, encoding, or carrying instructions 1324 for execution by the machine 1300 and that cause the machine 1300 to perform any one or more of the techniques of the present disclosure, or that is capable of storing, encoding, or carrying data structures used by or associated with such instructions 1324. Non-limiting machine-readable medium examples may include solid-state memories, and optical and magnetic media. In an example, a massed machine-readable medium comprises a machine-readable medium 1322 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    executing, by one or more processors, a machine-learning program that uses information about users of an online service to train a machine-learning model to calculate parameter preference scores for a plurality of parameters for use in a job search;
    detecting, by the one or more processors, a job search for a user;
    identifying, by the one or more processors, user parameters associated with the user;
    calculating, by the machine-learning model, the parameter preference scores for the user parameters;
    determining, by the one or more processors, search parameters by:
        determining, for each user parameter, a number of job postings with parameters that match the user parameter;
        calculating, for each user parameter, an average parameter relevance by dividing the parameter preference score by the number of job postings matching the user parameter; and
        selecting for use as search parameters a predetermined number of user parameters with the highest average parameter relevance;
    performing, by the one or more processors, a search of a job-postings database with the search parameters; and
    causing, by the one or more processors, presentation on a display of job postings based on the performed search of the job-postings database.

2. The method as recited in claim 1, wherein the parameter preference score is a probability of the parameter being a preferred parameter for the user.

3. The method as recited in claim 1, wherein the machine-learning program trains the machine learning model with information about users of the online service, the information comprising job applications submitted by the users of the online service, and user profile information.

4. The method as recited in claim 1, further comprising:
    before presenting the job postings, filtering results of the search of the job-postings database.

5. The method as recited in claim 4, wherein the filtering is performed by another machine-learning model based on the user information and information of the job postings.

6. The method as recited in claim 1, wherein the search of the job-postings database comprises a database query that includes a logical AND of matching the selected parameters.

7. The method as recited in claim 1, wherein identifying the user parameters comprises:
    determining which from the plurality of parameters matches information about the user.

8. The method as recited in claim 1, wherein the plurality of parameters includes skill parameters, title parameters, and functional area parameters.

9. The method as recited in claim 1, detecting the job search for the user comprises:
    creating the job search, without user explicit request, to determine possible job postings that match profile information of the user.

10. A system comprising:
    a memory comprising instructions; and one or more computer processors, wherein the instructions, when executed by the one or more computer processors, cause the system to perform operations comprising:

executing, by one or more processors, a machine-learning program that uses information about users of an online service to train a machine-learning model to calculate parameter preference scores for a plurality of parameters for use in a job search;

detecting, by the one or more processors, a job search for a user;

identifying, by the one or more processors, user parameters associated with the user;

calculating, by the machine-learning model, the parameter preference scores for the user parameters;

determining, by the one or more processors, search parameters by:
  determining, for each user parameter, a number of job postings with parameters that match the user parameter;
  calculating, for each user parameter, an average parameter relevance by dividing the parameter preference score by the number of job postings matching the user parameter; and
  selecting for use as search parameters a predetermined number of user parameters with the highest average parameter relevance;

performing, by the one or more processors, a search of a job-postings database with the search parameters; and causing, by the one or more processors, presentation on a display of job postings based on the performed search of the job-postings database.

11. The system as recited in claim 10, wherein the parameter preference score is a probability of the parameter being a preferred parameter for the user.

12. The system as recited in claim 10, wherein the machine-learning model is trained with information about users of the online service, the information comprising job applications submitted by the users of the online service, and user profile information.

13. The system as recited in claim 10, wherein the instructions further cause the one or more computer processors to perform operations comprising:
  before presenting the job postings, filtering results of the search of the job-postings database, wherein the filtering is performed by another machine-learning model based on the user information and information of the job postings.

14. A non-transitory machine-readable storage medium including instructions that, when executed by a machine, cause the machine to perform operations comprising:

executing, by one or more processors, a machine-learning program that uses information about users of an online service to train a machine-learning model to calculate parameter preference scores for a plurality of parameters for use in a job search;

detecting, by the one or more processors, a job search for a user;

identifying, by the one or more processors, user parameters associated with the user;

calculating, by the machine-learning model, the parameter preference scores for the user parameters;

determining, by the one or more processors, search parameters by:
  determining, for each user parameter, a number of job postings with parameters that match the user parameter;
  calculating, for each user parameter, an average parameter relevance by dividing the parameter preference score by the number of job postings matching the user parameter; and
  selecting for use as search parameters a predetermined number of user parameters with the highest average parameter relevance;

performing, by the one or more processors, a search of a job-postings database with the search parameters; and causing, by the one or more processors, presentation on a display of job postings based on the performed search of the job-postings database.

15. The non-transitory machine-readable storage medium as recited in claim 14, wherein the parameter preference score is a probability of the parameter being a preferred parameter for the user.

16. The non-transitory machine-readable storage medium as recited in claim 14, wherein the machine-learning model is trained with information about users of the online service, the information comprising job applications submitted by the users of the online service, and user profile information.

17. The non-transitory machine-readable storage medium as recited in claim 14, wherein the machine further performs operations comprising:
  before presenting the job postings, filtering results of the search of the job-postings database, wherein the filtering is performed by another machine-learning model based on the user information and information of the job postings.

* * * * *